United States Patent [19]

Bermes

[11] Patent Number: 5,597,905
[45] Date of Patent: Jan. 28, 1997

[54] PREPARATION OF BENZOTHIAZOLYLAZOANILINES

[75] Inventor: Rudolf Bermes, Ludwigshafen, Germany

[73] Assignee: BASF Aktiengesellschaft, Ludwigshafen, Germany

[21] Appl. No.: 574,427

[22] Filed: Dec. 15, 1995

[30] Foreign Application Priority Data

Dec. 23, 1994 [DE] Germany .................. 44 46 382.0

[51] Int. Cl.⁶ ..................................... C09B 41/00
[52] U.S. Cl. ...................... 534/788; 534/581; 534/582
[58] Field of Search ...................... 534/581, 582, 534/788

[56] References Cited

U.S. PATENT DOCUMENTS

| | | | |
|---|---|---|---|
| 3,057,848 | 10/1962 | Dehn, Jr. et al. | 534/788 |
| 3,379,713 | 4/1968 | Wallace et al. | 534/788 X |
| 3,442,886 | 5/1969 | Dickey et al. | 534/788 |
| 4,041,024 | 8/1977 | Wolfrum et al. | 534/788 X |
| 4,052,379 | 10/1977 | Gourley | 534/788 X |
| 4,271,071 | 6/1981 | Clark | 534/788 |
| 4,400,320 | 8/1983 | Keller et al. | 534/788 X |
| 4,488,992 | 12/1984 | Yoshinaga et al. | 534/788 |
| 4,889,535 | 12/1989 | Henzi | 534/788 X |
| 5,101,021 | 3/1992 | Altermatt | 534/788 |

FOREIGN PATENT DOCUMENTS

| | | | |
|---|---|---|---|
| 72621 | 2/1983 | European Pat. Off. | 534/788 |
| 0483382A1 | 5/1992 | European Pat. Off. | |
| 2456763 | 1/1981 | France . | |
| 2624130 | 6/1989 | France . | |
| 60-108469 | 6/1985 | Japan | 534/788 |
| 944250 | 12/1963 | United Kingdom | 534/788 |
| 2052548 | 1/1981 | United Kingdom . | |

OTHER PUBLICATIONS

A. Penchev et al., "Diazotization of 2–Amino–6–Methoxybenzothiazole at Elevated Temperature", Dyes and Pigments, vol. 16, pp. 77–81, 1991.

Arnold T. Peters et al., "Disperse Dyes: 4–Hetarylazo Derivatives from N–β–Cyanoethyl–N–β–Hydroxyethylaniline", J. Chem. Tech. Biotechnol., vol. 53, pp. 301–308, 1992.

Jolanta Sokolowska–Gajda et al., "A New Medium for the Diazotization of 2–Amino–6–Nitrobenzothiazole and 2–Aminobenzothiazole", Dyes and Pigments, vol. 20, pp. 137–145, 1992.

*Primary Examiner*—Fiona T. Powers
*Attorney, Agent, or Firm*—Oblon, Spivak, McClelland, Maier & Neustadt, P.C.

[57] ABSTRACT

Described is a process for preparing benzothiazolylazoanilines by diazotization of 2-aminobenzothiazoles in a mixture consisting essentially of phosphoric acid, sulfuric acid and water using customary diazotizing agents and subsequent addition of the reaction mixture to an aqueous acidic solution of the anilines.

6 Claims, No Drawings

PREPARATION OF BENZOTHIAZOLYLAZOANILINES

The present invention relates to a novel process for preparing benzothiazolylazoanilines by diazotization of 2-aminobenzothiazoles in an aqueous acidic medium and subsequent coupling with anilines in an aqueous acidic medium.

DE-A-3 839 459 describes the diazotization of 2-amino-(5),6,(7)-dichlorobenzothiazole (mixture) with nitrosylsulfuric acid in a mixture of glacial acetic acid, propionic acid and phosphoric acid and the subsequent coupling of the resulting diazonium salt with N-(2-acetoxyethyl)-N-methyl-3-methylaniline.

It is an object of the present invention to provide a novel process for preparing benzothiazolylazoanilines by diazotizing 2-aminobenzothiazoles in an aqueous acidic medium and subsequently coupling the resulting diazonium salts with anilines in an aqueous acidic medium. The target products shall be obtained in high yield and purity.

We have found that this object is achieved by a process for preparing azo dyes of the formula I

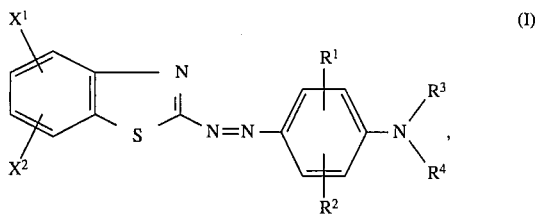

where
$X^1$ is hydrogen, nitro or halogen,
$X^2$ is hydrogen, $C_1$–$C_4$-alkoxy or halogen,
$R^1$ is hydrogen or $C_1$–$C_4$-alkoxy,
$R^2$ is hydrogen, $C_1$–$C_4$-alkyl or $C_1$–$C_4$-alkanoylamino, and
$R^3$ and $R^4$ are independently of each other $C_1$–$C_6$-alkyl with or without hydroxyl, $C_1$–$C_4$-alkoxy, $C_1$–$C_4$-alkanoyloxy, cyano or halogen substitution,
by diazotization of amines of the formula II

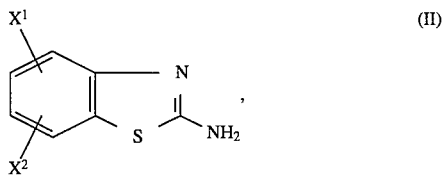

where $X^1$ and $X^2$ are each as defined above, and subsequent coupling with anilines of the formula III

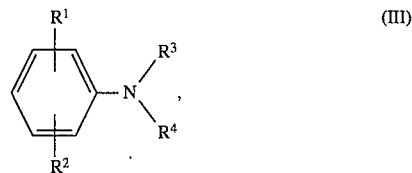

where $R^1$, $R^2$, $R^3$ and $R^4$ are each as defined above, which comprises
a) first diazotizing the amine of the formula II in a mixture consisting essentially of phosphoric acid, sulfuric acid and water using a customary diazotizing agent, and
b) secondly, adding the resulting reaction mixture to an aqueous acidic solution of the aniline of the formula III.

Any alkyl appearing in the abovementioned formulae may be straight-chain or branched.

In any substituted alkyl appearing in the abovementioned formulae the number of substituents is generally from 1 to 3, preferably 1 or 2.

$X^1$ and $X^2$ are each for example fluorine, chlorine or bromine.

$X^2$ may also be for example, like $R^1$, methoxy, ethoxy, propoxy, isopropoxy, butoxy, isobutoxy, sec-butoxy or tert-butoxy.

$R^2$, $R^3$ and $R^4$ are each for example methyl, ethyl, propyl, isopropyl, butyl, isobutyl, sec-butyl or tert-butyl.

$R^2$ may also be for example formylamino, acetylamino, propionylamino, butyrylamino or isobutyrylamino. $R^3$ and $R^4$ may each also be for example pentyl, isopentyl, neopentyl, tert-pentyl, hexyl, 2-methylpentyl, 2-hydroxyethyl, 2- or 3-hydroxypropyl, 2- or 4-hydroxybutyl, 2-methoxyethyl, 2- or 3-methoxypropyl, 2- or 4-methoxybutyl, 2-ethoxyethyl, 2- or 3-ethoxypropyl, 2- or 4-ethoxybutyl, 2-acetoxyethyl, 2- or 3-acetoxypropyl, 2- or 4-acetoxybutyl, 2-cyanoethyl, 2- or 3-cyanopropyl, 2- or 4-cyanobutyl, 2-chloroethyl, 2- or 3-chloropropyl, 2- or 4-chlorobutyl or trifluoromethyl.

Preference is given to a process for preparing azo dyes of the formula I where $X^1$ is hydrogen.

Preference is further given to a process for preparing azo dyes of the formula I where $X^2$ is $C_1$–$C_4$-alkoxy, in particular methoxy.

Preference is further given to a process for preparing azo dyes of the formula I where $R^1$ and $R^2$ are each hydrogen.

Preference is further given to a process for preparing azo dyes of the formula I where $R^3$ and $R^4$ are independently of each other unsubstituted or hydroxyl-substituted $C_1$–$C_6$-alkyl.

Particular preference is given to a process for preparing azo dyes of the formula Ia

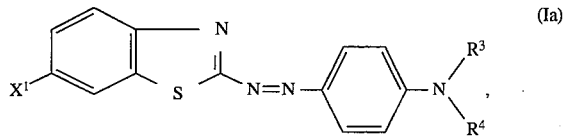

where $X^1$ is $C_1$–$C_4$-alkoxy, in particular methoxy, $R^3$ is $C_1$–$C_6$-alkyl, in particular methyl or ethyl, and $R^4$ is $C_1$–$C_6$-alkyl with or without hydroxyl substitution, in particular 2-hydroxyethyl.

The process of the present invention is generally carried out at a temperature which in step 1 is from –20° to +10° C., preferably from –10° to 0° C., and in step 2 from –10° to +20° C., preferably from –5° to 0° C.

In step 1 the temperature depends in particular on the stability of the diazonium salt to be formed.

Preference is given to a process where the amine of the formula II is diazotized in a mixture consisting essentially of from 10 to 65% by weight of phosphoric acid, from 5 to 25% by weight of sulfuric acid and from 10 to 85% by weight of water, each based on the weight of the mixture.

Particular preference is given to a process wherein the amine of the formula II is diazotized in a mixture consisting essentially of from 20 to 55% by weight, in particular from 30 to 50% by weight, of phosphoric acid, from 5 to 20% by weight of sulfuric acid and from 30 to 75% by weight, in particular from 35 to 65% by weight, of water, each based on the weight of the mixture.

The abovementioned amounts of phosphoric acid and sulfuric acid are each based on 100% strength by weight acid ($H_3PO_4$ and $H_2SO_4$).

The abovementioned percentages must be applied so that they always add up to 100% by weight.

The diazotization of step 1 is carried out with customary diazotizing agents, ie. those which are well known to the person skilled in the art. Specific instances are alkali metal nitrites, such as sodium nitrite and potassium nitrite, and nitrosylsulfuric acid.

The diazotization of the amine of the formula II is generally carried out with from 5 to 20% by weight, preferably from 10 to 15% by weight, of amine II, based on the weight of the phosphoric acid/sulfuric acid/water mixture.

The amount of diazotizing agent used per mole of amine II is generally from 1.0 to 1.2 mole equivalents, preferably from 1.0 to 1.1 mole equivalents.

The coupling of step 2 is carried out by adding the reaction mixture of step 1 to an aqueous acidic solution of the aniline of the formula III.

The amount of aniline III used per mole of amine II is customarily from 1.0 to 1.1 mol, in particular from 1.0 to 1.05 mol.

The aqueous acidic solution generally includes from 2 to 10% by weight, preferably from 2 to 5% by weight, each based on the weight of the solution, of aniline III.

The pH of the aqueous acidic solution is generally from 0 to 5, preferably from 0.5 to 3.0.

Suitable acids for preparing the aqueous acidic solution include for example sulfuric acid and hydrochloric acid.

The process of the present invention is conveniently carried out in step 1 by charging a suitable apparatus, for example a stirred tank, initially with phosphoric acid, sulfuric acid and water and then with the amine II. On establishment of the abovementioned temperature the diazotizing agent is then added, customarily a little at a time. Following a subsequent stirring phase of from 1 to 2 hours the resulting reaction mixture is added with stirring to the aqueous acidic solution of aniline III. After the reaction has ended, the reaction mixture can be filtered to obtain the azo dye of the formula I as a solid.

The process of the present invention, which can be carried out continuously as well as batchwise, gives the azo dyes of the formula I in high yield and purity.

The azo dyes of the formula I are suitable for dyeing polyamides or blends of polyamides and polyesters. In particular, however, they are suitable for preparing basic dyes by subjecting them to a quaternization.

The Examples which follow illustrate the invention.

EXAMPLE 1

A stirred vessel was charged with 1200 ml of water, 1330 g of 85% strength by weight phosphoric acid and 294 g of 96% strength by weight sulfuric acid. To this mixture were added 400 g of 2-amino-7-methoxybenzothiazole and dissolved at from 50° to 60° C. The solution was then cooled down to from −12° to −8° C. and 735 g of 42% strength by weight nitrosylsulfuric acid were run in at the abovementioned temperature over 1 h. This was followed by stirring at from −8° to −3° C. for 1 h.

The resulting solution was added at from −2° to 0° C. to a solution of 380 g of N-ethyl-N-(2-hydroxyethyl)aniline in 5000 ml of water, 300 g of 96% strength by weight sulfuric acid, 50 g of sulfamic acid and 8000 g of ice. This was followed by 1 h of stirring and the addition of 50% strength by weight sodium hydroxide solution until the pH of the reaction mixture was 1.5. It was diluted with water and filtered with suction, and the filter residue was washed with water and dried.

This yielded 740 g of the dye of the formula

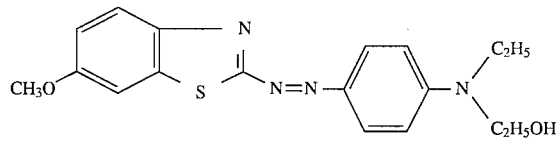

(purity: 98%)

EXAMPLE 2

Example 1 was repeated with 348 g of N-methyl-N-(2-hydroxyethyl)-aniline as coupling component, affording 720 g of the dye of the formula

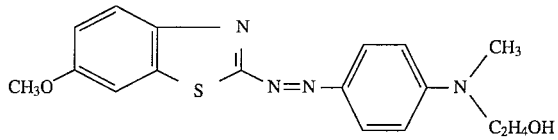

(purity: 99%).

EXAMPLE 3

Example 1 was repeated with 278.7 g of N,N-dimethylaniline as coupling component, affording 625 g of the dye of the formula

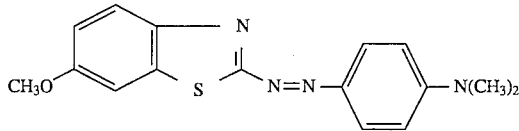

(purity: 97%).

EXAMPLE 4

A stirred vessel was charged with 134 ml of water, 153 g of 85% strength by weight phosphoric acid and 34 g of 96% strength by weight sulfuric acid. To this mixture were added 41 g of 2-amino-7-methoxybenzothiazole (88.5% by weight pure) and dissolved at from 50° to 60° C. The solution was then cooled down to from −6° to 0° C. and 15 g of sodium nitrite were added at the abovementioned temperature over 1 h. This was followed by stirring at from −6° to 0° C. for 1 h.

The resulting solution was added at from −2° to 0° C. to a solution of 35 g of N-ethyl-N-(2-hydroxyethyl)aniline in 600 ml of water, 29 g of 96% strength by weight sulfuric acid, 4 g of sulfamic acid and 700 g of ice. The batch was subsequently stirred for 1 h and then heated to 60° C. Thereafter 50% strength by weight sodium hydroxide solution was added until the pH of the reaction mixture was 1.5. It was filtered with suction and the filter residue was washed with water and dried, leaving 63.5 g of the dye of the formula

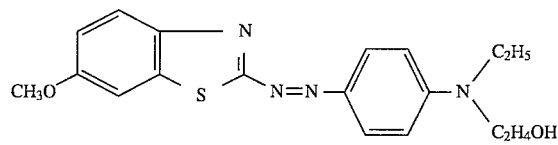

(purity: 96%).

EXAMPLE 5

A stirred vessel was charged with 172 ml of water, 115 g of 85% strength by weight phosphoric acid and 34 g of 96% strength by weight sulfuric acid. To this mixture were added 41 g of 2-amino-7-methoxybenzothiazole (88.5% by weight pure) and dissolved at from 50° to 60° C. The solution was then cooled down to from −5° to +2° C. and 5 g of sodium nitrite and 20 g of 96% strength by weight sulfuric acid were then added twice in succession, followed by a further 5 g of sodium nitrite. Thereafter the batch was stirred at from −5° to +2° C. for 1 h.

The resulting solution was added at from −2° to 0° C. to a solution of 35 g of N-ethyl-N-(2-hydroxyethyl)aniline in 600 ml of water, 29 g of 96% strength by weight sulfuric acid, 4 g of sulfamic acid and 700 g of ice. The batch was subsequently stirred for 1 h and then heated to 55° C. Thereafter 50% strength by weight sodium hydroxide solution was added until the pH of the reaction mixture was 1.5. It was filtered with suction and the filter residue was washed with water and dried, leaving 63.7 g of the dye of the formula

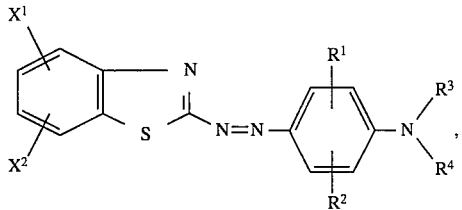

(purity: 97%).

We claim:

1. A process for preparing azo dyes of the formula I

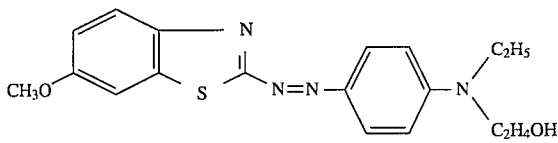

where $X^1$ is hydrogen, nitro or halogen, $X^2$ is hydrogen, $C_1$–$C_4$-alkoxy or halogen, $R^1$ is hydrogen or $C_1$–$C_4$-alkoxy, $R^2$ is hydrogen, $C_1$–$C_4$-alkyl or $C_1$–$C_4$-alkanoylamino, and $R^3$ and $R^4$ are independently of each other $C_1$–$C_6$-alkyl with or without hydroxyl, $C_1$–$C_6$-alkoxy, $C_1$–$C_4$-alkanoyloxy, cyano or halogen substitution, which comprises a) first diazotizing an amine of the formula II

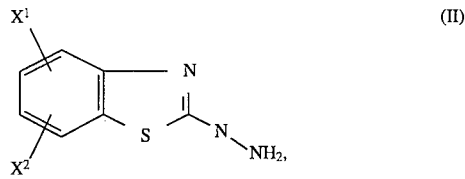

where $X^1$ and $X^2$ are each as defined above, in a mixture consisting essentially of from 10 to 65% by weight, based on the total weight of the mixture, of phosphoric acid, from 5 to 25% by weight, based on the total weight on the mixture, of sulfuric acid and from 10 to 85% by weight, based on the total weight on the mixture, of water using a customary diazotizing agent, and b) adding the resulting reaction mixture to an aqueous acidic solution of the aniline of the formula III

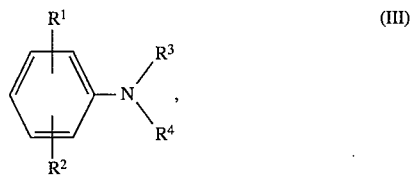

where $R^1$, $R^2$, $R^3$ and $R^4$ are each as defined above.

2. The process of claim 1 wherein step 1 is carried out at from −20° C. to +10° C. and step 2 at from −10° C. to +20° C.

3. The process of claim 1 wherein $X^1$ is hydrogen.

4. The process of claim 1 wherein $X^2$ is $C_1$–$C_4$-alkoxy.

5. The process of claim 1 wherein $R^1$ and $R^2$ are each hydrogen.

6. The process of claim 1 wherein $R^3$ and $R^4$ are independently of each other unsubstituted or hydroxyl-substituted $C_1$–$C_6$-alkyl.

* * * * *